UNITED STATES PATENT OFFICE.

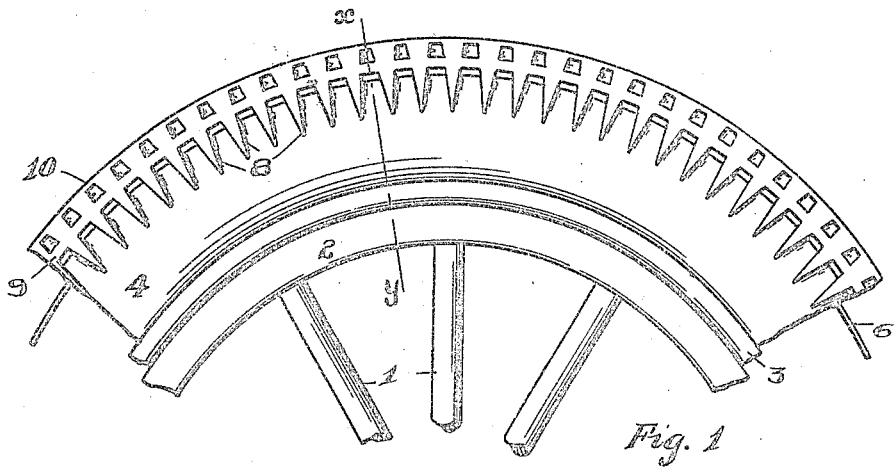
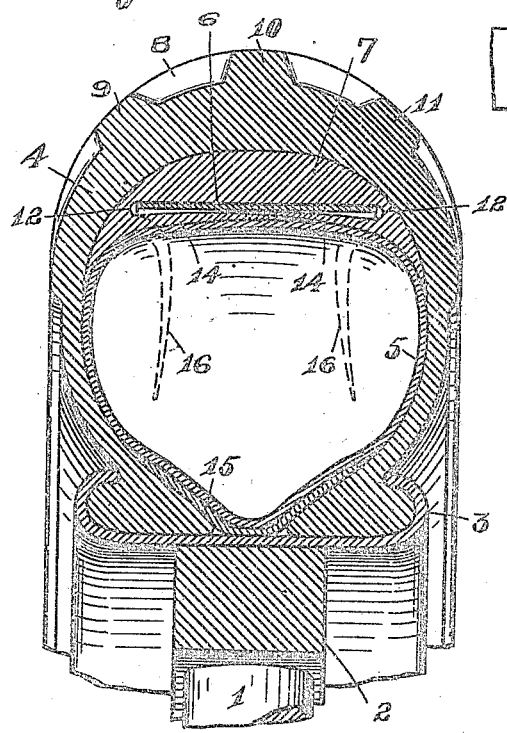
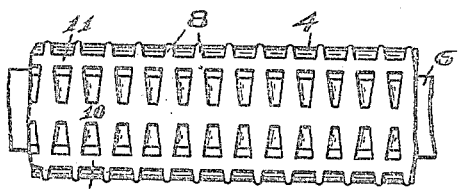
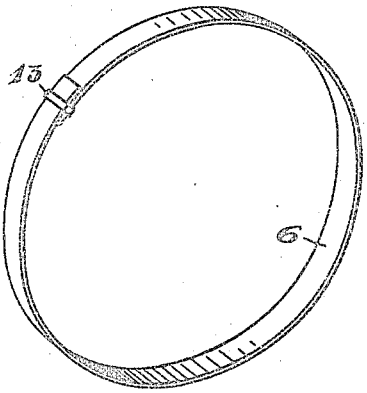

ALBERT M. FERGUSON, OF ROCHESTER, NEW YORK, ASSIGNOR TO WILLIAM KEYEL, OF PENFIELD, NEW YORK.

RESILIENT TIRE.

1,232,906.  Specification of Letters Patent.  Patented July 10, 1917.

Application filed August 2, 1916. Serial No. 112,695.

*To all whom it may concern:*

Be it known that I, ALBERT M. FERGUSON, a citizen of the United States, residing at Rochester, in the county of Monroe and State of New York, have invented a new and Improved Resilient Tire, of which the following is a specification.

This invention relates to pneumatic tires for road vehicles; and it consists of the general construction and arrangement of the several parts, as will hereinafter be fully described in this specification and defined in the claim.

The main object of the invention is to provide a strong and durable tire, preferably of the non-skid type, containing a freely expansible and contractible spring band interposed between the outer shoe and the air-tube, whereby the tire is made practically punctureless without its resiliency being in the least destroyed.

Other objects appertaining more particularly to features of construction will become apparent upon a complete disclosure of the invention.

The accompanying drawings illustrating my invention as embodied in an automobile tire are as follows:—

Figure 1 is a side elevation of a part of an automobile wheel, showing the tire mounted thereon; Fig. 2, an enlarged transverse sectional view on the line x—y of Fig. 1; Fig. 3, a top plan view of a portion of the tire; and Fig. 4, a perspective view of the inner metal band.

Similar reference characters refer to similar parts throughout the several views.

The numeral 1 indicates the spokes, 2 the felly and 3 the metal rim of an automobile wheel, such rim being shown as of the clencher type.

The tire consists of the outer shoe 4, which engages the rim 3 in the usual way, the general cross-sectional conformation being similar to others well known in the art, also, the air-tube 5, and the metal band 6 interposed between the air-tube and the inner surface of the outer shoe tread portion.

The outer shoe is made up of alternate layers of rubber and canvas, in the usual way, and formed integrally with the inner part of the tread portion is a rubber filling strip 7. This shoe is, preferably, of the non-skid type and when so made has its outer surface provided with transverse rubber ribs 8 spaced apart, as clearly indicated in Figs. 1 and 3, the height of the ribs being greater at the center of the tread than at the sides thereof; and to lessen the tendency to skid, the ribs 8 are connected together by three circumferential bands 9, 10 and 11, the center one (10) being located at the center of the tread and the outer ones (9 and 11) at about the extreme flattening points thereof. By gradually diminishing the height of the transverse ribs 8 it will be obvious that the height of the intervening spaces will also be gradually diminished so that any mud or dirt taken up by these spaces will drop out by gravity.

The inner surface of the filler 7 does not correspond with the outer transverse curvature of the shoe but is straight or horizontal, and the circumferential protecting band 6 of thin spring metal which lies against this surface is supported at its side edges in circumferentially extending recesses 12. These recesses are of greater radial dimension than the thickness of the band 6 and are formed between the body of the filler strip and the flap members or aprons 14 integral therewith in a manner to permit free expansion and contraction of the band to compensate for the dilation and compression of the tire when the wheel is in motion. The ends of the spring band overlap and one of them is provided with a box-loop 13 through which the other end is adapted to have slidable action. The band 6 is prevented from contact with the air-tube 5 by the circumferentially extending overlapping aprons 14 supported against the inner face of the band by the air-tube when it is inflated, such aprons gradually decreasing in thickness toward their free edges. The air-tube is prevented from contact with the metal rim 3 by the usual apron 15 which has one side vulcanized to the inner surface of the shoe, the free side being held in place by the inflated tube.

In placing the band 6 in the tire, the shoe 4 is spread apart and the aprons 14 at this time assume substantially the positions as indicated by dotted lines at 16 in Fig. 2. The air-tube 5 is then inserted in the shoe and when inflated supports the aprons against the band 6 in the manner shown.

The purpose of the metal band 6 is, of course, to protect the air-tube from puncture and being free to expand and contract while the wheel is in motion will not effect the resiliency of the tire.

Various modifications of the invention may be made without departing from its scope or sacrificing the principle thereof.

What I claim is:

The combination, in a pneumatic tire, of an air-tube, an outer shoe, a centrally disposed filler strip within the shoe and formed integrally therewith, such strip having a transversely flat inner surface; circumferentially extending and laterally spaced inwardly projecting members on the filler strip adjacent the sides of said flat inner surface, and a freely expansible and contractible flat spring band encircling said members and removably supported thereby; said members forming, with the body of the filler, recesses of greater radial dimension than the thickness of said band and extending transversely over the inner face of the band gradually becoming thinner toward their free edges and having said free edges overlapping.

ALBERT M. FERGUSON.